Oct. 4, 1927.

V. PELLEGRINO 1,644,351

ELECTRICIAN'S PLIERS

Filed Dec. 11, 1925

INVENTOR.
Vincenzo Pellegrino
BY
ATTORNEY

Patented Oct. 4, 1927.

1,644,351

UNITED STATES PATENT OFFICE.

VINCENZO PELLEGRINO, OF RYE, NEW YORK.

ELECTRICIAN'S PLIERS.

Application filed December 11, 1925. Serial No. 74,719.

This invention relates generally to a device for skinning and cutting wire, the invention having more particular reference to a novel type of wire skinning and cutting device. The invention has for an object the provision of an improved device of this nature which may be manipulated more readily and which may be cheaply manufactured.

For further comprehension of the invention, and of the objects and advantages thereof, reference will be had to the following description and accompanying drawing, and to the appended claims in which the various novel features of the invention are more particularly set forth.

Fig. 1 of the drawing is a side elevational view of my improved device.

Figure 1:
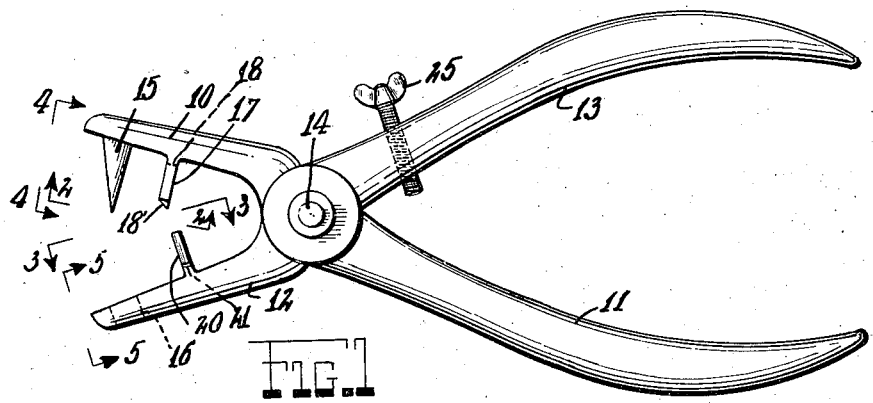
Figure 2:
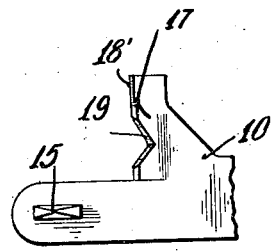
Fig. 2 is an enlarged fragmentary view of one of the cutting members taken on the plane indicated by the line 2—2.
Figure 4:
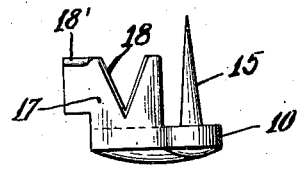
Fig. 4 is an end view of the cutting member shown in Figure 2 taken on a plane indicated by the line 4—4 of Fig. 1.
Figure 3:
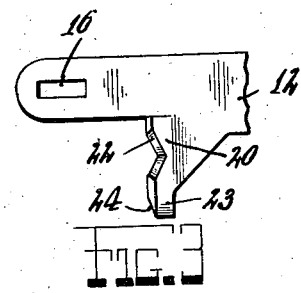
Fig. 3 is a similar view of the other cutting member taken on a plane indicated by the plane 3—3.
Figure 5:
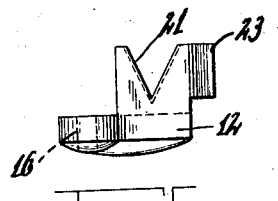
Fig. 5 is a similar view of the cutting member shown in Figure 3 taken on a plane indicated by the line 5—5 of Fig. 1.

As here embodied my improved device comprises a jaw member 10 having a suitable handle 11 and a similar jaw member 12 having a similar handle 13, the said jaw members 10 and 11 being pivotally attached to one another as designated by the numeral 14 on the accompanying drawing, the heretofore mentioned construction being such as will permit of manipulation, opening and closing similar to that of a pair of scissors or pliers. The jaw member 10 is provided with a pointed protruding member 15, at or near the extremity of the jaw member 10 and at right angles thereto. The other jaw member 12 is provided with suitable aperture 16, so located that the jaw members 10 and 12 may be closed, the pointed protruding member entering the aperture 16.

The skinning and cutting member 17 is at right angles to the jaw member 10, preferably formed thereon by turning inwards a portion of the edge portion of the member 10, the said skinning and cutting member 17 having a V shaped or notched portion 18, and a beveled edge 19, such as ordinarily used for cutting. The jaw member 12 is provided with a similar skinning and cutting member 20 at right angles to the jaw member 12, preferably formed thereon by turning inwards a portion of the edge portion of the jaw member 12, the said skinning and cutting member 20 having a similar V shaped or notched portion 21 and a similar beveled edge 22 as heretobefore described. The said skinning and cutting member 20 is also provided with an extended portion 23 having a beveled edge 24, adapted to be used as hereinafter set forth for scraping remaining insulation material from the wire.

In the operation or manipulation of my improved device, by means of the pointed protruding member 15 it is obvious that braided wire may be readily separated, and that the insulation may be readily cut by means of the two notched portions 18 and 21, a screw 25, such as a thumb screw or set screw, or any similar threaded screw, suitably threaded into one of the handles 11 or 13, as shown on the accompanying drawing, so as to set the distance between the two notched portions 18 and 21, when the device is closed, to accommodate various gages of wires, so that the notched portions 18 and 21 will not cut the wire, the insulation having been cut as heretobefore described, by pulling the device along the wire, the said insulation may be readily removed or skinned, and by turning back the screw 25 so as to permit the device to close entirely, the said wire may be readily cut. It should be understood that when the improved pliers are employed to simultaneously unbraid and scrape the wire free from insulation, the wire is drawn in the direction of the handle ends of the pliers while the latter are urged forwardly or held substantially at rest. This operation may be accomplished by inserting the projection 15 between the braided wires in advance of their ends so as to leave a portion of wire sufficiently long to provide a grip.

The end of cutting member 17 is provided with a partially beveled edge 18′ adapted to register with a flat end portion of the cutting member 20. This sharpened beveled edge may be employed for cutting bare wire when such wire is disposed between the same and the flat portion of the member 20.

It is further obvious that by means of the beveled edge 24 of the extended portion 23 that the said wire may be scraped, so as to remove any particles of insulation that may have remained.

It will be understood that my improved device may be made of any materials, such as ordinarily used for devices of this nature.

While I have above described the preferred form, construction and arrangement of the several elements employed, it will be understood that the device is, nevertheless, susceptible of considerable modification therein, and I therefore reserve the privilege of resorting to all such changes as may be fairly embodied within the spirit and scope of the invention as claimed.

Having thus described my invention, what I claim as new, and desire to secure by Letters Patent of the United States is as follows:—

1. A device for skinning wire comprising cutting edges for removing insulation from individual wires and a separating means for separating twisted wires positioned in advance of said cutting edges adapted to unbraid said wires while the latter are being drawn over said cutting edges.

2. A device for skinning insulation from wires comprising pivotally mounted jaw members, a projection on one of said jaw members adapted to be inserted between individual wires of a twisted wire conductor, said projection being positioned at the end of said jaw and adapted to extend through a registering opening in the other jaw, and insulation cutting members on the sides of said jaws having V-shaped openings therein adapted to remove insulation from the individual wires after they have been unbraided by said projection and during unbraiding of adjacent portions of said wires.

3. A device for skinning insulation from wires comprising pivotally mounted jaw members, a projection on one of said jaw members adapted to be inserted between individual wires of a twisted wire conductor, said projection being positioned at the end of said jaw and adapted to extend through a registering opening in the other jaw, and insulation cutting members on the sides of said jaws adapted to be engaged by the individual unbraided wires of said conductor as the latter is drawn in the direction of said device and while adjacent unbraided portions of said conductor are being separated.

In testimony whereof I have affixed my signature.

VINCENZO PELLEGRINO.